Figure 1:
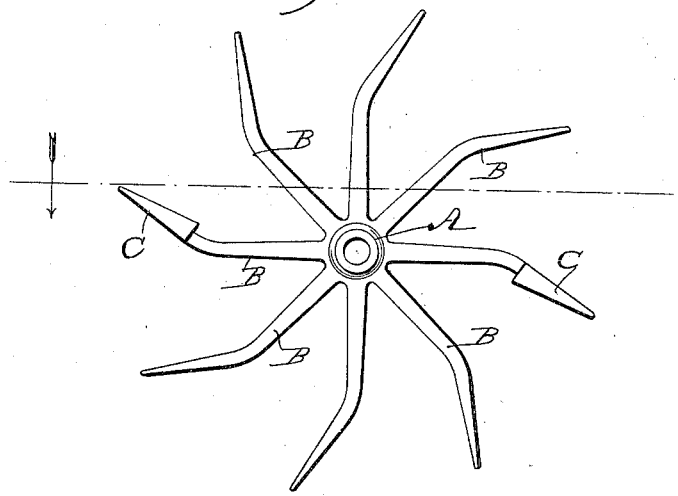

No. 662,626. Patented Nov. 27, 1900.
L. J. LINDSAY.
DRIVE WHEEL AND MARKER FOR CORN PLANTERS.
(Application filed June 4, 1900.)

(No Model.)

Witnesses:
R. C. Orwig.
R. H. Orwig.

Inventor: Leroy J. Lindsay,
By Thomas G. Orwig, Attorney.

UNITED STATES PATENT OFFICE.

LEROY J. LINDSAY, OF SEYMOUR, IOWA, ASSIGNOR OF ONE-HALF TO J. T. PHILLIPS, OF SAME PLACE.

DRIVE-WHEEL AND MARKER FOR CORN-PLANTERS.

SPECIFICATION forming part of Letters Patent No. 662,626, dated November 27, 1900.

Application filed June 4, 1900. Serial No. 19,053. (No model.)

*To all whom it may concern:*

Be it known that I, LEROY J. LINDSAY, a citizen of the United States, residing at Seymour, in the county of Wayne and State of Iowa, have invented a new and useful Driver-Wheel and Marker for Automatic Check-Row Corn-Planters, of which the following is a specification.

Heretofore rimless wheels consisting of hubs and straight spokes extending radially from the hubs have been fixed to rotatable shafts to serve as means for operating seed-dropping mechanism in automatic check-row corn-planters. Markers have also been fixed to the ends of spokes extending from hubs fixed to such rotatable axles to serve as means for making marks in the ground at regular intervals of space as a corn-planter was advanced in the field to serve as guides in directing return trips to maintain the rows equidistant and in alinement with the rows previously planted. Spokes have also been inclined rearward relative to a planter-carriage, but in no instance have they been inclined forward to operate as and for the purposes contemplated by my invention. When the spokes are straight, they strike the ground before they assume a perpendicular position and cut a furrow in the form of an arc that is deepest at its longitudinal center. The same result, but in greater degree, occurs when the spokes are bent rearward, and when the ground over which they advance is loose, dry, and light the resistance to the rotary motion of the wheel is much less than when the soil is hard, wet, and heavy, and consequently the distances advanced at different revolutions of the wheel in such varying conditions of soil causes irregularity in spaces between rows. By inclining the ends of the spokes forward they will not strike the ground as quick as when straight or inclined rearward, and as the carriage advances each point of each spoke will sink into the ground in a perpendicular line until the inclined portion assumes a perpendicular position, and then as the advance is continued it will be lifted upward in a perpendicular line and withdrawn from the ground practically at the same point it entered. Each spoke thus in turn becomes a pivot upon which the wheel revolves and the sliding of the wheel and irregularity of spacing and crookedness of rows are avoided and uniformity in check-rows produced.

My object is to maintain regularity of space advanced at each revolution of a wheel; and my invention consists in the wheel hereinafter set forth, pointed out in my claims, and illustrated in the accompanying drawings, in which—

Figure 2:
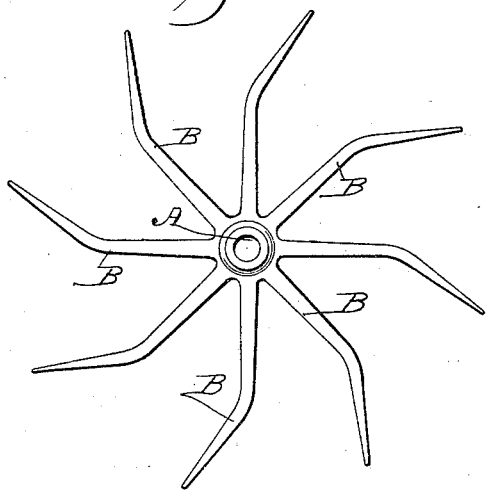
Figure 3:
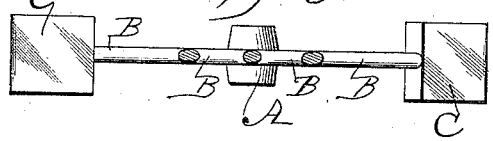

Figure 1 is a side view of a wheel adapted to serve as a means for driving a rotatable shaft to which it may be fixed in a corn-planter and also adapted to make two marks in the ground equidistant from each other at each revolution of the wheel. Fig. 2 shows a wheel in which no feet or markers are fixed to any one of the radial spokes. Fig. 3 is a transverse sectional view looking downward the dotted line in Fig. 1 and shows the flat faces and forms of the two feet or markers on the ends of two spokes that extend in alinement with each other in opposite directions from the axis of the hub.

The letter A designates a hub adapted to be fixed to a rotatable shaft. A plurality of spokes B are fixed to the hub at equal distances apart and extend radially, but their free end portions are inclined forward at an angle of about fifteen or twenty degrees relative to their main portions, that are fixed to the hub. Feet or markers C are fixed to the ends of two of the inclined end portions of the spokes, as shown in Figs. 1 and 3. It is obvious these markers C may be left off, as shown in Fig. 2, when used for rotating a shaft, without making two distinctive marks at each revolution. It is also obvious that the free end of each spoke that is inclined forward will penetrate the ground and assume a perpendicular position before the main and straight portion of the spoke passes a perpendicular line and not after, as heretofore, and consequently will be lifted out of the ground without prying up and lifting ground and meeting resistance that will prevent the complete wheel from uniform motion and a regular advance of the measure of its circumference at each revolution as required to actuate the shaft and seed-dropping mechanism at regular intervals to maintain uniformity in planting check-rows.

I am aware that teeth and cutters have extended radially from rotatable hubs and shafts in cultivators and the free ends of the teeth and cutters curved forwardly; but such curved ends are not adapted to enter the ground perpendicularly, as contemplated by my invention, for the purpose of producing uniformity of space between the points where corn is planted by means of automatic corn-planters.

Having described the construction, purpose, and operation of my invention, its practical utility will be obvious to persons familiar with the art to which it pertains, and what I claim as new, and desire to secure by Letters Patent, is—

1. A rimless wheel for automatic check-row corn-planters, consisting of a hub adapted to be fixed to a rotatable shaft and a plurality of spokes fixed to the hub to extend radially therefrom and the free and straight end portions of the spokes inclined forward relative to their main and fixed portions, as shown and described, to operate in the manner set forth for the purposes stated.

2. A rimless wheel for automatic check-row corn-planters consisting of a hub adapted to be fixed to a rotatable shaft, a plurality of spokes fixed to the hub at regular spaces apart and inclined forward at their free straight ends and straight feet or markers fixed to the inclined ends of some of the spokes, as shown and described, to operate in the manner set forth for the purposes stated.

LEROY J. LINDSAY.

Witnesses:
C. A. ARMANTROUT,
G. W. WHARTON.